(12) United States Patent
Gowrisankar (10) Patent No.: US 11,707,981 B2
(45) Date of Patent: Jul. 25, 2023

(54) MULTI-SPEED TRANSMISSION SYSTEM AND OPERATING METHOD

(71) Applicant: Dana Automotive Systems Group, LLC, Maumee, OH (US)

(72) Inventor: Devaraj Gowrisankar, Ghent (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 157 days.

(21) Appl. No.: 17/337,324

(22) Filed: Jun. 2, 2021

(65) Prior Publication Data

US 2022/0388391 A1 Dec. 8, 2022

(51) Int. Cl.
*B60K 17/08* (2006.01)
*B60K 1/00* (2006.01)
*F16H 57/04* (2010.01)
*F16H 37/08* (2006.01)
*F16H 3/64* (2006.01)
*B60K 17/16* (2006.01)
*F16H 57/037* (2012.01)
(Continued)

(52) U.S. Cl.
CPC ............... *B60K 17/08* (2013.01); *B60K 1/00* (2013.01); *B60K 17/165* (2013.01); *F16H 3/64* (2013.01); *F16H 37/0813* (2013.01); *F16H 57/037* (2013.01); *F16H 57/0423* (2013.01); *B60K 2001/001* (2013.01); *F16H 61/686* (2013.01); *F16H 2057/02034* (2013.01); *F16H 2057/02052* (2013.01); *F16H 2200/0021* (2013.01); *F16H 2200/0039* (2013.01); *F16H 2200/2007* (2013.01); *F16H 2200/2094* (2013.01); *F16H 2702/02* (2013.01)

(58) Field of Classification Search
CPC ........ B60K 17/08; B60K 1/00; B60K 17/165; B60K 2001/001; F16H 3/64; F16H 37/0813; F16H 57/037; F16H 57/0423; F16H 61/686; F16H 2057/02034; F16H 2057/02052; F16H 2200/0021; F16H 2200/0039; F16H 2200/2007; F16H 2200/2094; F16H 2702/02
See application file for complete search history.

(56) References Cited

U.S. PATENT DOCUMENTS 4,418,777 A 12/1983 Stockton
5,620,387 A * 4/1997 Janiszewski ............. B60K 1/00
475/207
(Continued)

FOREIGN PATENT DOCUMENTS

CN 111664230 A 9/2020
DE 102014218610 A1 3/2016
(Continued)

*Primary Examiner* — Colby M Hansen
(74) *Attorney, Agent, or Firm* — McCoy Russell LLP (57) ABSTRACT

Methods and systems are provided for a multi-speed transmission. The multi-speed transmission includes a housing, an electric motor with a stator and a rotor positioned within the housing, and a planetary assembly positioned on a first axial side of the electric motor. The transmission further includes a first and second clutch unit spaced away from one another, each including a synchronizer, and designed to selectively rotationally couple to the rotor and to rotationally couple the rotor to different gears in the planetary assembly and where the electric motor and planetary assembly are coaxially arranged.

17 Claims, 6 Drawing Sheets

(51) Int. Cl.
  *F16H 57/02*  (2012.01)
  *F16H 61/686*  (2006.01)

(56) References Cited

U.S. PATENT DOCUMENTS

| | | | | |
|---|---|---|---|---|
| 5,845,732 | A * | 12/1998 | Taniguchi | B60K 17/16 |
| | | | | 180/65.6 |
| 7,624,828 | B2 * | 12/2009 | Kozarekar | B60K 6/365 |
| | | | | 280/157 |
| 7,867,125 | B2 * | 1/2011 | Kim | B60K 17/046 |
| | | | | 475/221 |
| 8,640,801 | B2 * | 2/2014 | Hennings | B60K 7/0007 |
| | | | | 180/65.6 |
| 10,189,346 | B2 | 1/2019 | Beck | |
| 10,760,658 | B2 | 9/2020 | Cho et al. | |
| 2005/0148421 | A1 * | 7/2005 | Keuth | B60K 1/02 |
| | | | | 475/8 |
| 2012/0258831 | A1 * | 10/2012 | Knoblauch | B60K 7/0007 |
| | | | | 475/5 |
| 2012/0283061 | A1 * | 11/2012 | Karlsson | B60L 15/2054 |
| | | | | 475/150 |
| 2020/0282827 | A1 | 9/2020 | Kaltenbach et al. | |

FOREIGN PATENT DOCUMENTS

| | | |
|---|---|---|
| DE | 102015218252 A1 | 3/2017 |
| EP | 3230104 B1 | 5/2021 |
| KR | 20190105029 A1 | 9/2019 |
| WO | 2017012808 A1 | 1/2017 |

\* cited by examiner

FIG. 1

| Ratio Selection | 1st Clutch Unit (124) | | | 2nd Clutch Unit (126) | | |
|---|---|---|---|---|---|---|
| | Ground | 1st Sun Gear (132) | Rotor (120) | Rotor (120) | 1st Ring Gear (138) | Ground |
| 0 | | X | | | X | |
| 3 | | X | X | | X | X |
| 2 | X | X | | X | X | |
| 1 | | X | X | X | X | |

X = Engaged

MULTI-SPEED TRANSMISSION SYSTEM AND OPERATING METHOD

TECHNICAL FIELD

The present description relates generally to an electric drive system with a transmission in a vehicles and more particularly to a multi-speed transmission for an electric drive axle.

BACKGROUND AND SUMMARY

Transmissions in electric vehicles may employ gear assemblies and clutch arrangements to deliver power from an electric motor to drive wheels. In order to achieve desired launch performance and satisfy low and high speed torque targets, under various operating conditions, the transmissions may be designed as multi-speed transmissions to increase vehicle efficiency. However, to accomplish this, gear assemblies and clutch arrangements within the transmission may become more complex, increasing the size and weight of the transmission. In some electric vehicles, transmissions have been designed to expand the available gear ratios at the expense of the transmission packageability. One approach is shown by Kaltenbach et al. in US 2020/0282827 A1. Therein, Kaltenbach teaches a three-speed transmission with a shift sleeve and two planetary arrangements. The inventors have recognized potential issues with the Kaltenbach's electric drive system as well as other electric drive systems. As one example, Kaltenbach's drive system lacks synchronizers and the clutch sleeve acts as a single device for shifting between the three gear ratios. Noise, vibration, and harshness (NVH) may consequently increase during some shifting events. Further, the single shifting device taught by Kaltenbach may form a complex structure that may be difficult to efficiently package in the system.

In one example, the issues described above may be addressed by a method for operating an electric drive system in a vehicle. The electric drive system includes a multi-speed transmission having a housing and an electric motor that includes a stator and a rotor positioned within the housing. The system further includes a planetary assembly positioned on a first axial side of the electric motor. The transmission further includes a first and second clutch unit that have synchronizer devices. The clutch units are designed to selectively rotationally couple the rotor to or ground a plurality of gears in the planetary assembly. Additionally, the motor, planetary assembly, and clutches are coaxially arranged with regard to one another. In this way, the coaxial arrangement of the electric motor and planetary assembly, in conjunction with the positioning of the first and second clutch units, may provide a compact design offering enhance packageability and load balancing within the transmission and more even weight distribution. Specifically, in one example, the clutch units may be arranged on opposing sides of the electric motor to provide the abovementioned load and weight distribution balancing as well as reduce system complexity. Manufacture and assembly of the clutch units may therefore be more efficiently carried out, thereby reducing manufacturing costs, if wanted.

In yet another example, the clutch units may each include dog clutch. Specifically, the dog clutch in the first clutch unit may ground a sun gear in a first stage of the planetary assembly, in a first position, and may rotationally couple the rotor to the sun gear, in a second position. Further, the dog clutch in the second clutch unit may ground a ring gear in the first stage of the planetary assembly, in a first position, and rotationally couples the rotor to the ring gear, in a second position. By grounding selected gears in the planetary assembly in this manner, the transmission may achieve discrete gear ratios that are more evenly distributed and lie within a desired (e.g., usable) range of ratios.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a multi-speed transmission system in an electric vehicle. In one example, a compact arrangement of the multi-speed transmission is provided with an electric motor, planetary gear assembly, and clutches that are coaxially arranged within a transmission housing. The multi-speed transmission achieves a desired balance between gear range and transmission weight and size. Consequently, transmission performance may be increased along with the system's market appeal. Further the transmission may be more easily integrated into a greater number of vehicle platforms due to its performance characteristics and relatively compact size. Specifically, the electric drive system may achieve desired performance characteristics (e.g., a high efficiency and gear range) and a relatively high power density when compared to other multi-speed electric drive systems. To achieve the abovementioned characteristics, the clutches may be arranged on opposing axial sides of the motor to provide a more balanced weight and load distribution. Further, the clutches are designed to ground selected gears in the planetary assembly as well as rotationally couple the rotor to different gears in a first stage of the planetary assembly to achieve a targeted range of gear ratios. Specifically, in one example, the clutches may be designed to both ground a ring and a sun gear in a first stage of the planetary assembly as well as rotationally attach these gears to the rotor in different gears, to compactly achieve targeted gear reductions. An axle housing may be used to ground the gears to increase transmission compactness.

Figure 1:
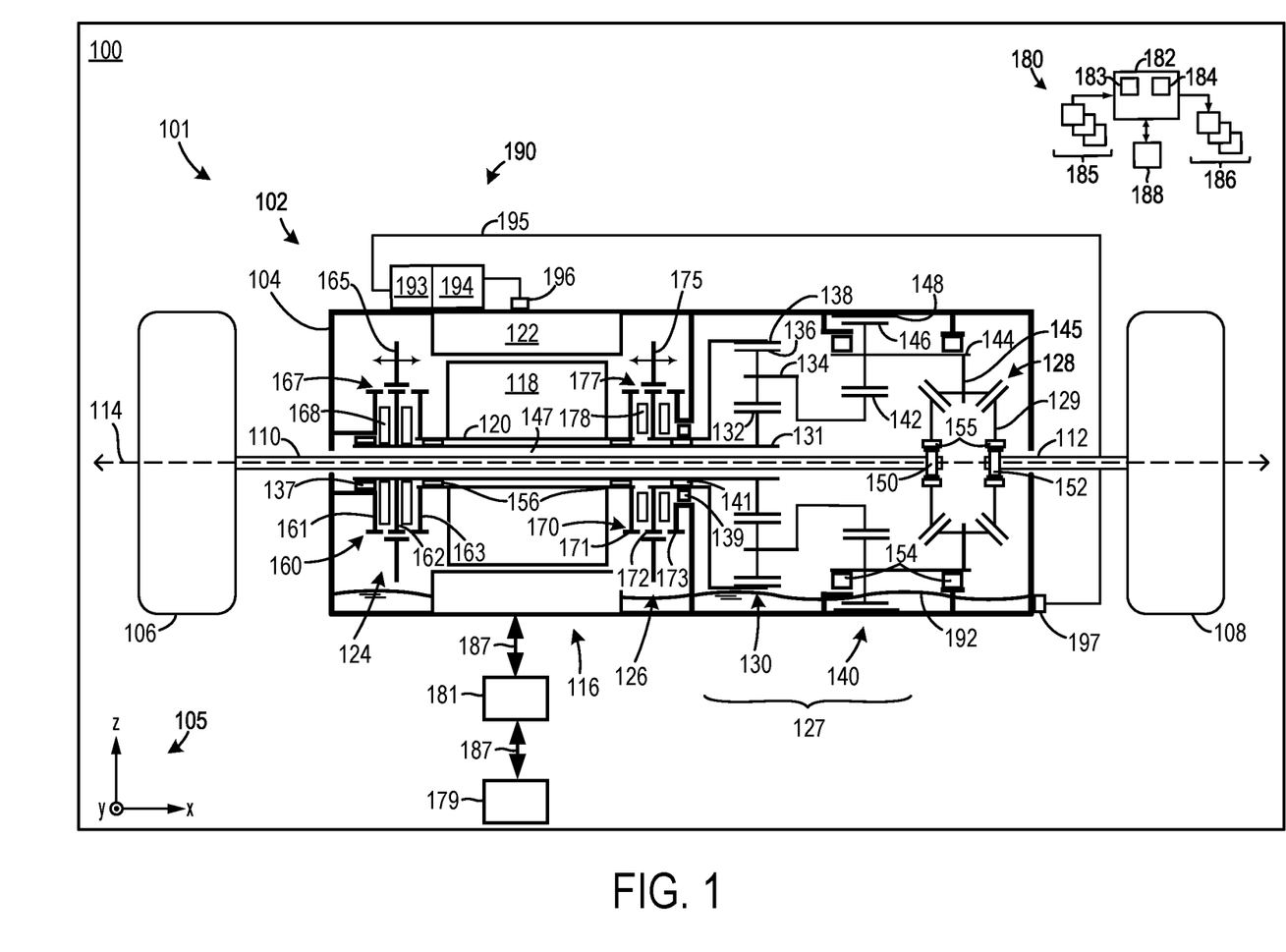
FIG. 1 is a schematic representation of a vehicle with a multi-speed transmission

FIG. 1 shows a schematic depiction of a vehicle 100 having an electric drive system 101. The vehicle 100 may take a variety of forms in different embodiments, such as a light, medium, or heavy duty vehicle. For instance, the vehicle 100 may be a passenger car, van, truck, bus, commercial vehicle, etc. The electric drive system 101 includes a multi-speed transmission 102 within a housing 104. Using a multi-speed transmission permits the size of an electric motor 116 in the system and associated components (e.g., an energy storage device 179 (e.g., a battery), an inverter 181, and the like) to be reduced, if desired, when compared to transmissions with fewer gear ratios such as two-speed or single-speed transmissions. The stick diagram of FIG. 1 provides a topology of the vehicle, transmission, and corresponding components.

The vehicle 100 may include left and right wheels 106, 108 driven by respective left and right axle shafts 110, 112 that have a common central rotational axis 114 via the transmission 102 included in the electric drive system 101. The electric drive system 101 and transmission 102 may be used in a front axle and/or a rear axle of the vehicle 100. Specifically, in some examples, the electric drive system may be used in a hybrid vehicle or may be used in rigid beam axle that has certain transaxle characteristics. As described herein, axial movement may refer to a component's movement along a direction parallel to the central rotational axis. The axis 114 is further provided in FIGS. 2-5, for reference.

The electric drive system 101 is depicted an electric drive axle, in FIG. 1. Specifically, in one example, the electric drive axle may be an electric transaxle. In such an example, the transmission 102, a differential 128, and the axle shafts 110, 112 of the electric drive system 101 may be integrated and collocated in a housing 104. As such, the component used for vehicle propulsion may be incorporated into an axle assembly with a continuous structure that extends between the drive wheels. The electric transaxle configuration may reduce the overall weight and size of the transmission package, thereby reducing the unsprung weight in the vehicle, as the overall weight of the drive system may not carried by a suspension system of the vehicle, thereby enhancing suspension kinematics and vehicle handling. In other examples, the differential and/or the axle shafts may be located separately from the transmission, such that the electric drive system includes a final drive arrangement spaced away from the transmission. Still further, in other examples, the multi-speed transmission 102 may additionally or alternatively be rotationally coupled to an engine and/or other suitable prime mover. In such an example, the vehicle may a hybrid vehicle or an internal combustion engine (ICE) vehicle where the motor is omitted. Still further in some examples, the vehicle may include a second axle that is coupled to an ICE and controlled via a central processing unit (CPU), such as an electronic control unit.

The electric motor 116 with a rotor 118 that rotates on a shaft 120 and electromagnetically interacts with a stator 122, fixedly coupled to the housing 104. The electric motor 116 may be a motor-generator that both generates rotational energy, during some conditions, and, conversely, generates electrical energy, during other conditions. The electric motor may be coupled to the energy storage device 179 (e.g., battery, capacitor, combinations thereof, and the like) to both draw power from and transfer power to the energy storage device during different modes of operation. The system may further include the inverter 181 when an alternating current (A/C) type motor is used. For instance, the motor and inverter may be designed as multiphase devices. To elaborate, the motor may be a synchronous three, six, or nine phase motor (e.g., a permanent magnet, synchronous reluctance, or synchronous induction type motor) and the inverter may be a multi-phase inverter with a number of phases that match the motor. However, asynchronous type motors have been contemplated which may however be less efficient than synchronous motors. Further, the energy storage device 179 may be coupled to the inverter 181 and/or the motor 116. Arrows 187 denote the flow of power between the motor, inverter, and energy storage device. Further, the energy storage device 179 and the inverter 181 are shown positioned external to the housing 104. However, one or both of the energy storage device and inverter may be at least partially enclosed within the housing, in some instances.

To accomplish the power transfer from the electric motor 116 to the vehicle wheels 106, 108, the transmission 102 may include a first clutch unit 124, a second clutch unit 126, a planetary assembly 127, and a differential 128. In some examples, the electric motor, clutch units, planetary assembly, and differential may be coaxially arranged along the rotational axis 114. A coaxial arrangement of the electric drive system components reduces a size of the transmission package, and may allow for performance gains with increased efficiency and power density. Further, these components may be enclosed in a common housing 104, such as when the electric drive system 101 is configured as an electric transaxle. The use of a common housing may provide a compact package with reduced space for assembly in the vehicle 100, and may further allow for the use of a common lubrication system to lubricate the drive system components enclosed within the housing. Specifically, in one example, the housing 104 may enclose the electric motor 116, the planetary assembly 127, and the final drive components. In this way, a strong yet space efficient electric drive axle may be formed. Additionally, the multi-speed transmission may allow for enhanced performance and efficiency from the electric motor and other electronic power components and the battery, when compared to a single-speed transmission.

The planetary assembly 127 may be a multi-stage planetary, such as a two-stage planetary that includes a first planetary stage 130 and a second planetary stage 140. In some examples, the first planetary stage 130 may include a first carrier 134 with first planet gears 136 meshing with a first sun gear 132 and a first ring gear 138. In one example, the rotor shaft 120 may be radially located by roller bearings on a hollow shaft 131 on which the first sun gear 132 is connected using splines, in one example. Alternatively, the hollow shaft 131 may be formed as one-piece with the first sun gear 132 on a right end and on the left end the synchronize rings 168 may be connected to the shaft via splines, in another example. Further, the shaft 131 may be supported at a left end by radial bearings 137 (e.g., ball bearings) and on the right by radial bearings 141 (e.g., needle roller bearings). The first ring gear 138 may be located radially and axially within the housing 104 via ball bearings 139 and more generally the first stage of the planetary assembly may be floating to compactly achieve desired gears ratios in the different locking configurations where the first sun gear is locked to the case, the ring gear is locked to the case, or the first sun gear and the first ring gear are locked to the rotor shaft, referred to as a train locked configuration. In other words, the gears in the first stage of the planetary assembly may not be grounded. However, in other examples, one or more gear in the first stage may be permanently grounded.

The second planetary stage 140 may include a second carrier 144 with planet gears 146 meshing with a second sun gear 142 and a second ring gear 148. In one example, the carrier 134 of the first stage 130 may be rotationally coupled to the sun gear 142 of the second stage 140. Further, in some examples, the ring gear 148 may be grounded by (e.g., fixed to) the housing 104.

The two-stage planetary arrangement may provide a compact gear reduction design with a wide range of gear ratios. Alternatively, in other examples, different planetary configurations have been contemplated for various gear components of the planetary assembly 127. For instance, the multi-stage planetary assembly 127 may be a three-stage planetary having an additional stage coaxially arranged with the first and second planetary stages, which may allow for the realization of additional gear ratios through the transmission 102. However, as the number of planetary stages is increased, complexity is also increased and the overall transmission efficiency may be reduced.

The planetary assembly 127 may be positioned on one axial side of the electric motor 116 and receives power therefrom when the transmission is in drive mode. In other words, the planetary assembly 127 may be selectively rotationally coupled to the rotor shaft 120 via operation of the first and second clutch units 124, 126. Specifically, in some examples, the first stage 130 of the planetary assembly 127 may be configured to receive rotational power from the rotor shaft 120 via the first and second clutch units 124, 126, as will be described herein with regard to clutch design and operation, and transfer power to the second stage 140.

In one example, the carrier 144 of the second stage 140 and differential case 129 may be integrally made as one piece and connected to the differential 128 via a shaft 145 and/or other suitable mechanical connection. Specifically, in one example, the carrier 144 and the shaft 145 may be integrally formed with the differential case 129. However, other configurations for coupling the differential case 129 for rotation with the carrier 144 have been contemplated, in other examples. As such, rotation of the carrier 144 serves as an output of the planetary assembly 127 to provide rotational power to the axle shafts 110, 112 and thus to the vehicle wheels 106, 108, respectively. The axle shaft 110 may extend through a central opening 147 in the rotor shaft 120 and planetary assembly 127 to permit the shaft to compactly traverse the axle.

The differential 128 may further include side gears 150, 152 which mate with the axle shafts 110, 112, respectively, whereby power may travel from the differential 128 through the associated axle shafts to the drive wheels 106, 108. In some cases, the side gears 150, 152 may include interior profiles (e.g., splines) mating with exterior profiles of the axle shafts. However, other attachment techniques may be used to couple the axle shafts to the side gears, such as bolts, welds, press fitting, combinations thereof, and the like.

In one example, the differential 128 may be an open differential, to permit speed differentiation between the left axle shaft 110 and the right axle shaft 112 which deliver power to the drive wheels 106 and 108, respectively. However, in other examples, the differential may have a different configuration, such as an electronic locking differential, limited slip differential, or a torque vectoring dual clutch which may however increase the size and complexity of the electric axle.

Due to the cancellation of radial forces in the coaxially arranged planetary assembly 127, a set of ball bearings 154 (e.g., deep groove spherical ball bearings) may be included in the system. The bearings 154 support and accommodate rotation of the carrier 144 of the second stage 140 and the case 129 of the differential 128. The ball bearings may be used instead of costlier tapered roller bearings. As such, the system's manufacturing costs may be reduced. The ball bearings may operate more efficiently than tapered roller bearings due to the preload on the tapered roller bearings that increase friction losses. In other examples, however, different types of bearings may be used, such as, for instance, other types of roller bearings (e.g., cylindrical roller bearings, needle roller bearings, taper roller bearings, etc.). When costlier taper roller bearings are used, the bearing may be preloaded which increases friction and decreases efficiency. Additionally, bearings 156 may be coupled to the rotor shaft 120. Further, in some examples, bearings 155 may be provided in the system to support and accommodate rotation side gears of the differential 128.

Bearings (e.g., needle roller bearings) may further be provided for the planet gears 136, 146 and/or between the axle shaft 110 and the rotor shaft 120. To reduce system costs, tapered roller bearings may not be used in the transmission, in certain examples.

The first and second clutch units 124, 126 may be positioned on opposing axial sides of the electric motor 116. Such an arrangement may enhance load balancing within the transmission 102 and provide more even weight distribution. However, in other examples, the first and second clutch units 124, 126 may be positioned on one axial side of the electric motor (e.g., between the electric motor and the planetary assembly).

The first and second clutch units 124, 126 may each include a dog clutch 160, 170 with a synchronizer device 167, 177, respectively, as described herein, designed to shift the transmission 102 between a plurality of gear ratios of the planetary assembly 127. The synchronizer devices may include synchronizer rings (e.g., blocker rings) 168, 178, respectively, in one specific example. The synchronizer devices may allow for smoother transitions shifting between gears, which may decease noise, vibration, and harshness (NVH) and enhance a vehicle operator's driving experience.

The plurality of gear ratios may include at least three gear ratios, such that shifting between gear ratios may include shifting between two of three gear ratios. Further, in some examples, shifting between gear ratios may include operating the clutch units 124, 126 to rotationally couple at least one of sun gear 132 and ring gear 138 of the first stage 130 of the planetary assembly 127 to the rotor shaft 120. Even further, shifting between gear ratios may include grounding at least one of the sun gear 132 and the ring gear 138 of the first stage 130 to the housing 104. To elaborate, the first clutch unit 124 may include a first shift sleeve 165 and three clutch interfaces (e.g., dog clutch interfaces) 161, 162, 163. The interfaces may each include a series of teeth or splines profiled to mate with corresponding teeth of the first shift sleeve 165. The shift sleeve 165 is designed to axially translate when the first clutch unit 124 is operated to shift the transmission 102 between gear ratios. For example, the shift sleeve 165 may be axially translated (e.g., to the left or right) so as to engage one or more of the interfaces in the first clutch unit, depending on the intended gear ratio.

The synchronizer device 167 may include multiple synchronizer rings 168, as previously indicated. Specifically, a first synchronizer ring may be positioned between the interfaces 161, 162, and a second synchronizer ring may be positioned between the interfaces 162, 163. The synchronizer rings 168 may interact with the shift sleeve 165 during shifting transients to facilitate smooth power transfer. The synchronizer rings 168 may, in some cases, include an annular body with external teeth at an outer diameter thereof and configured to engage with respective teeth of the shift sleeve, during certain conditions. Further, in some examples, the synchronizer rings 168 may include internal splines at an inner diameter thereof configured to engage with external splines on a left end of the hollow shaft 131, as previously discussed.

In one example, as the first shift sleeve 165 slides axially to the left or right, the synchronizer rings may be pushed to the left or right, respectively. Thus, one of the synchronizer rings 168 may begin frictionally interacting with an adjacent clutch interface 161, 162, or 163 in order to initiate a pre-synchronization step, causing a rotational speeds of the synchronizer ring, shift sleeve, and clutch interface to begin to equalize. With further axial displacement of the shift sleeve 165, the internal teeth of the shift sleeve may align with the series of teeth of the desired clutch interface 161, 162, or 163 and mate therewith so as to transfer rotational force thereto. In some examples, the teeth of the interfaces, synchronizer rings, and/or shift sleeve may include a ramped (e.g., angled) profile to assist in alignment or engagement (e.g., meshing) during a shifting event. In this way, the shift sleeve 165 may smoothly engage one or more of the interfaces 161, 162, and 163 due to the rotational speed matching accomplished with the synchronizer devices 167. Consequently, NVH, such as gear grinding, during shifting transients may be reduced, or eliminated, in certain cases.

Similarly, the dog clutch 170 may include a second shift sleeve 175 and three clutch interfaces 171, 172, 173, each including a series of teeth profiled to mate with corresponding teeth or splines of the second shift sleeve 175. As illustrated, the interface 171 is rotationally coupled to the rotor shaft 120, the interface 172 is rotationally coupled to the ring gear 138, and the interface 173 is grounded by the housing 104. However, the interfaces may be coupled to other gears in the planetary reduction and/or grounded in a different manner, in alternate examples.

Figure 7:
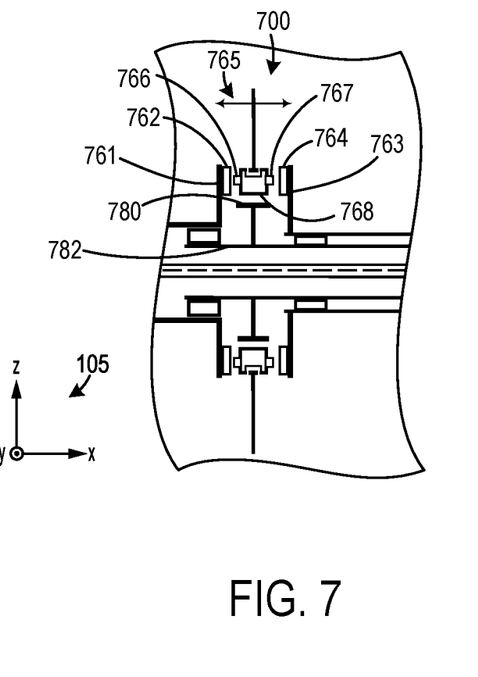
FIG. 7 shows an example of an alternate clutch arrangement.

The first and second clutch units 124, 126 may include other synchronization components in addition to the synchronizer rings, such as, for instance, a synchronizer hub coupled to the shift sleeve via locking elements (e.g., struts), biasing elements (e.g., springs), and the like. Such a configuration may reduce (e.g., eliminate) the chance of harsh shifting but may also increase system cost and complexity. In other examples, however, a different clutch unit configuration may be implemented for shifting between gears, such as a friction clutch pack design having one or more clutch plates, which may increase complexity and cost of the clutch units, as compared to the shift sleeve, face clutch, and synchronizer ring arrangement. As such, the first and second clutch units 124, 126 may be substituted with other suitable clutch devices that permit selective engagement between transmission components (e.g., between a driving component and a driven component), in alternate embodiments. For instance, one alternative clutch arrangement is illustrated in FIG. 7, where a face clutch 700 includes an axially slidable shift component 765 that may include axially extending teeth 766, 767 disposed on a left side and a right side, respectively. Further, in the face clutch 700, clutch interfaces 761, 763 may include corresponding axially extending teeth 762, 764, respectively. When the shift component 765 is moved to the left and right the associated teeth may engage and permit torque transfer through the clutch to the selected components. Further, in this example, a main body 768 of the shift component 765 may have splines along an inner portion thereof for engaging with splines in a gear 780 that is attached to the shaft 782. It will be appreciated that the shaft 782 may be the hollow sun gear shaft or the ring gear shaft.

Returning to FIG. 1, the positions of shift sleeves 165, 175 and resulting clutch interface engagement, in combination, may allow the transmission to operate in a plurality of gear ratios by selectively providing rotational power to components of the first stage 130 of the planetary assembly 127. An actuator and shift drum may be provided for controlling the axial translation of each of shift sleeves 165 and 175 to achieve the desired positions of each. Suitable actuators include a shift fork, a hydraulic actuator, an electromechanical actuator (e.g., a solenoid), a pneumatic actuator, combinations thereof, etc.

In the illustrated embodiment, the rotor shaft 120 may be coupled, at opposite axial ends thereof, with the clutch interface 163 of the first clutch unit 124 and the clutch interface 171 of the second clutch unit 126. Further, the clutch interface 161 of the first clutch unit 124 and the clutch interface 173 of the second clutch unit 126 may each be fixedly coupled to the housing 104. Even further, the clutch interface 162 of the first clutch unit 124 may be coupled to the first sun gear 132 of the first stage 130 of the planetary assembly 127, and the clutch interface 172 of the second clutch unit may be coupled to the first ring gear 138 of the first stage 130 of the planetary assembly 127. In this way, when the shift sleeve 165 engages both of the clutch interfaces 162 and 163, the first sun gear 132 may be rotationally coupled to the rotor 118 via the shaft 120.

When the shift sleeve 175 engages both clutch interfaces 171, 172, the first ring gear 138 may be rotationally coupled to the rotor 118. Conversely, when the shift sleeve 165 is positioned to engage both of the clutch interfaces 161 and 162, the first sun gear 132 may be grounded to the housing 104, and when the shift sleeve 175 is positioned to engage both of the clutch interfaces 172, 173, the first ring gear 138 may be grounded to the housing, due to the clutch interfaces 161 and 173 being fixed to the housing 104. Grounding the gears in the planetary reduction in this manner permits the load distribution to be shifted to a relatively strong component when compared to electric drivelines that ground gears using another stationary vehicle structure. Further, grounding the clutches in regions of the housing adjacent to axially opposing sides of the motor may decrease localized loading which may degrade the housing, under some conditions.

The sun gear 132 and the ring gear 138 of the first stage 130 of the planetary assembly 127 may be selectively rotationally connected with the rotor shaft 120 as a result of the clutch configuration, as determined by the position of the shift sleeves 165, 175 of first and second clutch units 124, 126, respectively, to operate the transmission in various gear ratios.

In some examples, the first and second clutch units 124, 126 may also be shifted to operate the transmission 102 in a disconnect mode, such that the planetary assembly 127 is disconnected from the rotor 118 of the electric motor 116. As shown in FIG. 1, in the disconnect mode, the dog clutches 160, 170 such that shift sleeve 165 is positioned to solely engage the clutch interface 162, so that the first sun gear 132 of the first stage 130 is free to independently rotate with regard to the rotor 118 and the housing 104, and the shift sleeve 175 is positioned to solely engage the clutch interface 172, so that the first ring gear 138 of the first stage 130 is free to independently rotate with regard to the rotor and the housing. Specific shifting configurations of the first and second clutch units 124, 126 corresponding to the plurality of gear ratios of transmission 102 are described in greater detail with regards to FIGS. 2-5.

The transmission 102 may further include a lubrication system 190 designed to provide lubricant (e.g., natural and/or synthetic oil) to the various components and assemblies within housing 104. For instance, the lubrication system may be a splash lubrication system that distributes lubricant to the gears in the planetary assembly and/or lubricant to the motor for cooling from a sump 192. In such an embodiment, various catchment areas within the housing 104 may collect splash lubricant and direct the collected lubricant through channels to the electric motor, the bearings, and between the meshing gears of the planetary assembly. Additionally or alternatively, the lubrication system 190 may, in some examples, include a pump 194 with a filter 193 for driving lubricant flow through the system, and a plurality of conduits 195 and/or other suitable lubricant distribution components, such as nozzles, valves, jets, and the like.

In other examples, the pump 194 may be provided at an exterior of the housing 104. However, in some examples, the pump may be included within the housing or omitted. In the illustrated embodiment, the pump 194 supplies lubricant to an inlet 196 in the housing 104, which may be proximate the electric motor 116. Specifically, in one example, lubricant for cooling the motor may travel from the inlet 196 through conduits that extend through or are adjacent to the motor for cooling. Further, lubricant collected within the sump 192 may be pumped from the housing at an outlet 197, which may be positioned proximate and/or below the differential 128, and returned to the filter 193 and the pump 194 via the conduits 195. The use of the lubricant for both the electric motor cooling and gear train lubrication may reduce complexity and costs associated with the manufacture and assembly of the system. However, in other examples, other configurations of the lubrication system have been contemplated.

The vehicle 100 may further include a control system 180 with a controller 182. The controller may include a processor 183 and a memory 184 with instructions stored therein that when executed by the processor cause the controller to perform various methods, control techniques, etc., described herein. The processor 183 may include a microprocessor unit and/or other types of circuits. The memory 184 may include known data storage mediums such as random access memory, read only memory, keep alive memory, combinations thereof, etc.

The controller 182 may receive various signals from sensors 185 positioned in the vehicle 100 and the transmission 102. Conversely, the controller may send control signals to various actuators 186 at different locations in the vehicle and transmission based on the received signals and instructions stored in the memory 184 of the controller 182. Further, an input device 188 (e.g., gear selector) may be in communication with the controller 182. In an example where the transmission 102 is an automatic three-speed transmission, the controller 182 may automatically cause the shift sleeves 165, 175 to translate axially to engage with clutch interfaces to achieve a first, second, or third gear ratio. However, in other examples, such as in the case of a manual transmission, shifting between gear ratios may be initiated in response to a vehicle operator interacting with a gear selector that generates a shift request. The position of the shift sleeves and resultant clutch configuration for each of the first, second, and third gear ratios will be described herein with respect to FIGS. 2-5.

An axis system 105 is provided in FIG. 1, as well as FIGS. 3-5 and 7, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
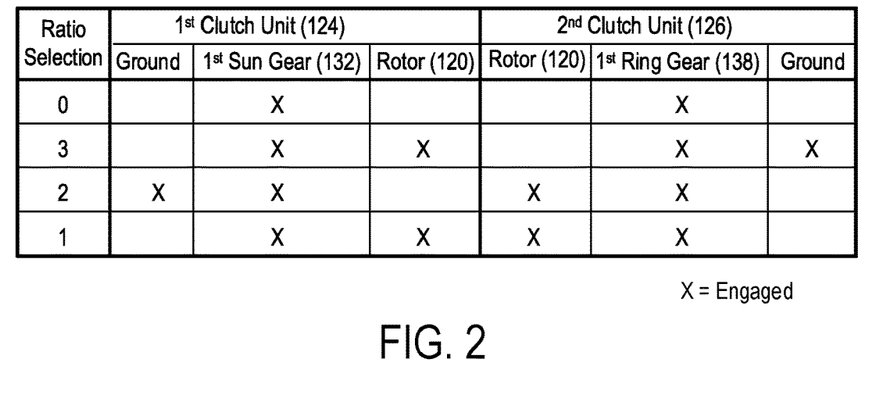
FIG. 2 is a table representing clutch positions in different gear ratios.

FIG. 2 depicts a table summarizing the configurations of the first and second clutch units 124, 126, and corresponding components depicted in FIG. 1, in a first, second, and third gear ratio (denoted as ratio selections 1, 2, and 3, respectively), as well as the disconnect mode (denoted as ratio selection 0). As such, the first sun gear and the first ring gear may refer to the first sun gear 132 and the first ring gear 138, respectively, in the first planetary stage 130 of the planetary assembly 127. Specifically, the table depicts the engagement established via the first and second clutch units 124, 126 for each of the ratio selections. Thus, the shift sleeve 165 of the first clutch unit 124 may accomplish grounding (e.g., of the first sun gear) by engaging the clutch interface 161, which is fixed to the housing 104, and the clutch interface 162. Further, the shift sleeve 165 rotationally couples to the rotor shaft 120 by engaging clutch interfaces 163 and 162. Similarly, the shift sleeve 175 of the second clutch unit 126 may accomplish grounding (e.g., of the first ring gear) by engaging the clutch interface 173, which is also fixed to the housing 104, and the clutch interface 172. Additionally, the second clutch unit 126 rotationally couples to the rotor shaft 120 by engaging clutch interfaces 172 and 173.

In the disconnect mode, as illustrated in FIG. 1, the gear ratio is zero. The first shift sleeve 165 of the first clutch unit 124 may solely engage the clutch interface 162 that is rotatably coupled to the first sun gear 132 in the first planetary stage 130. Further in the disconnect mode, the second shift sleeve 175 solely engages the clutch interface 172 that is rotatably coupled to the first ring gear 138 in the first planetary stage 130. In this way, both the first and second planetary stages 130, 140 are free to rotate independently from the rotor shaft 120 and not grounded by the housing 104 in the disconnect mode. As such, the planetary assembly 127 and thus the vehicle wheels 106, 108 may not receive rotational energy from the electric motor 116 in the disconnect mode.

Figure 5:
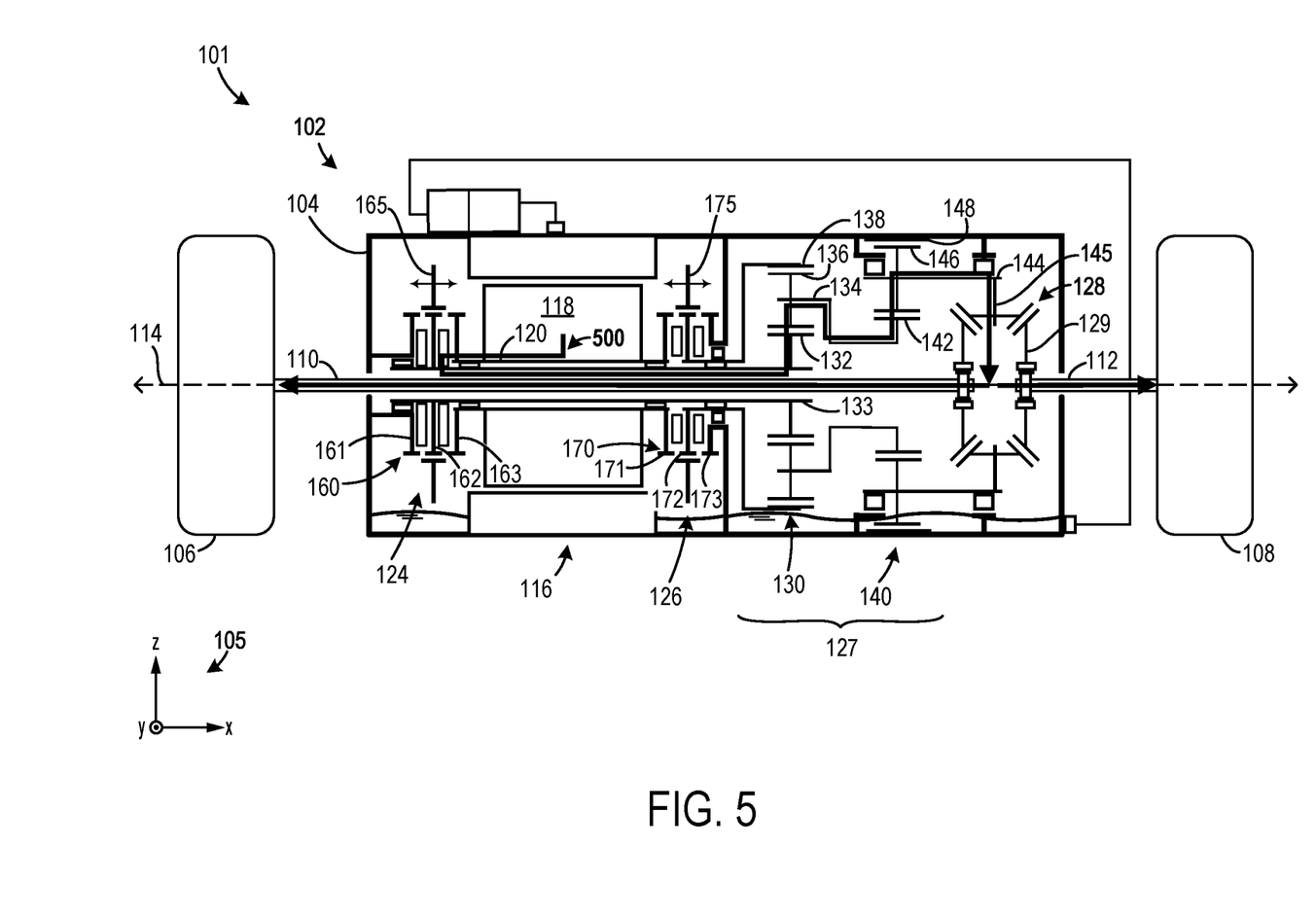
FIG. 5 shows the multi-speed transmission of FIG. 1 operating in a third gear ratio.

In the third gear ratio, as illustrated in in FIG. 5, the first sun gear 132 is rotatably coupled to the rotor shaft 120, and the first ring gear 138 is grounded. To achieve the third gear ratio, the shift sleeve 165 of the first clutch unit 124 is moved (e.g., axially translated) to a position to engage clutch interfaces 162 and 163, such that the first sun gear 132 is locked for rotation with the rotor shaft 120. Additionally, to transition into the third gear ratio, the shift sleeve 175 of the second clutch unit 126 is moved to engage clutch interfaces 172 and 173, such that the first ring gear 138 is grounded.

Figure 4:
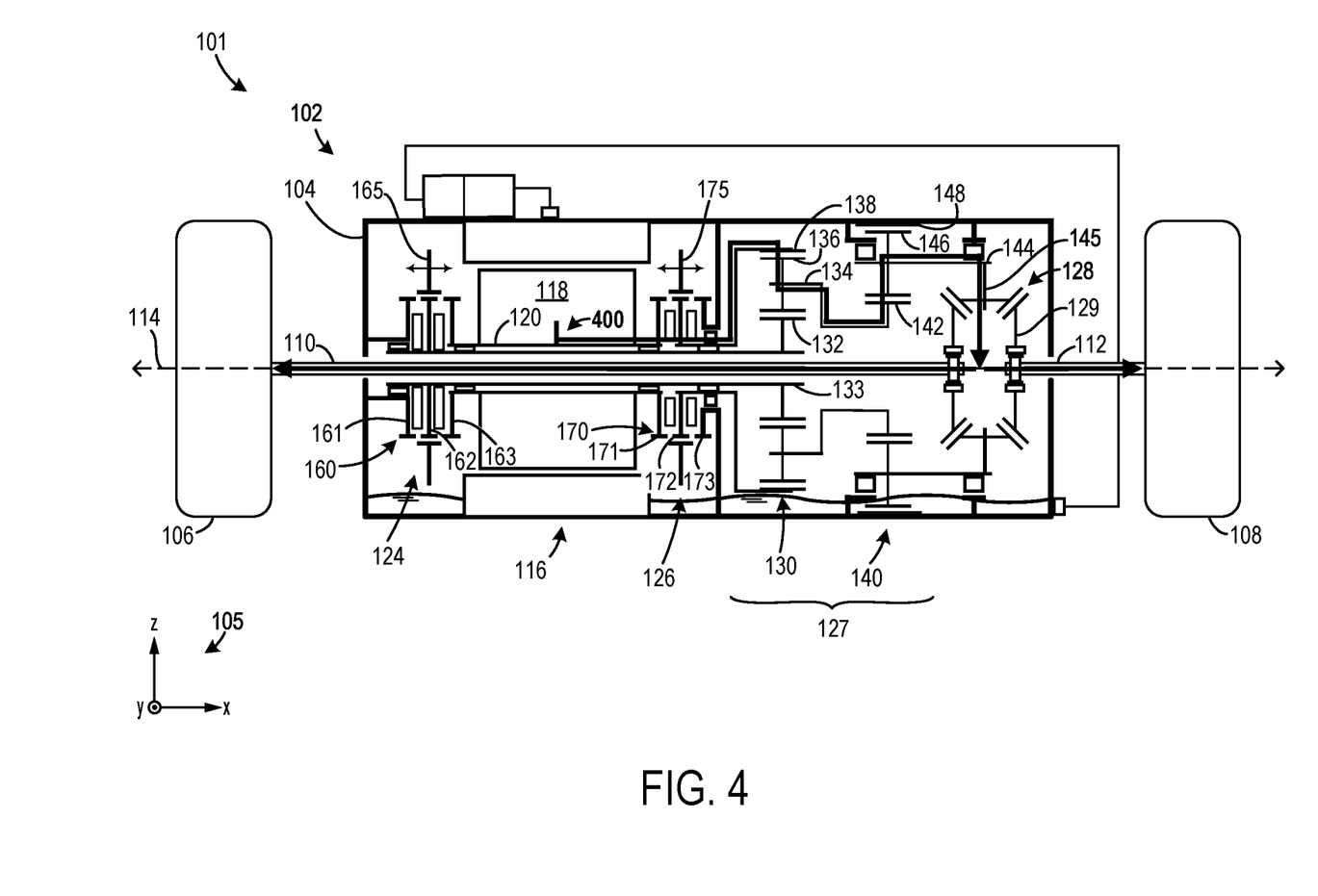
FIG. 4 shows the multi-speed transmission of FIG. 1 operating in a second gear ratio.

In order to shift into the second gear ratio, as illustrated in FIG. 4, the shift sleeve 165 of the first dog clutch 160 is moved to a position to engage clutch interfaces 171 and 172, such that the first sun gear 132 is grounded (e.g., locked to the housing 104). Additionally, during the transition into the second gear ratio, the shift sleeve 175 of the second dog clutch 170 remains engaged with clutch interfaces 171 and 172, such that the first ring gear 138 is kept rotatably coupled to the rotor shaft 120.

Figure 3:
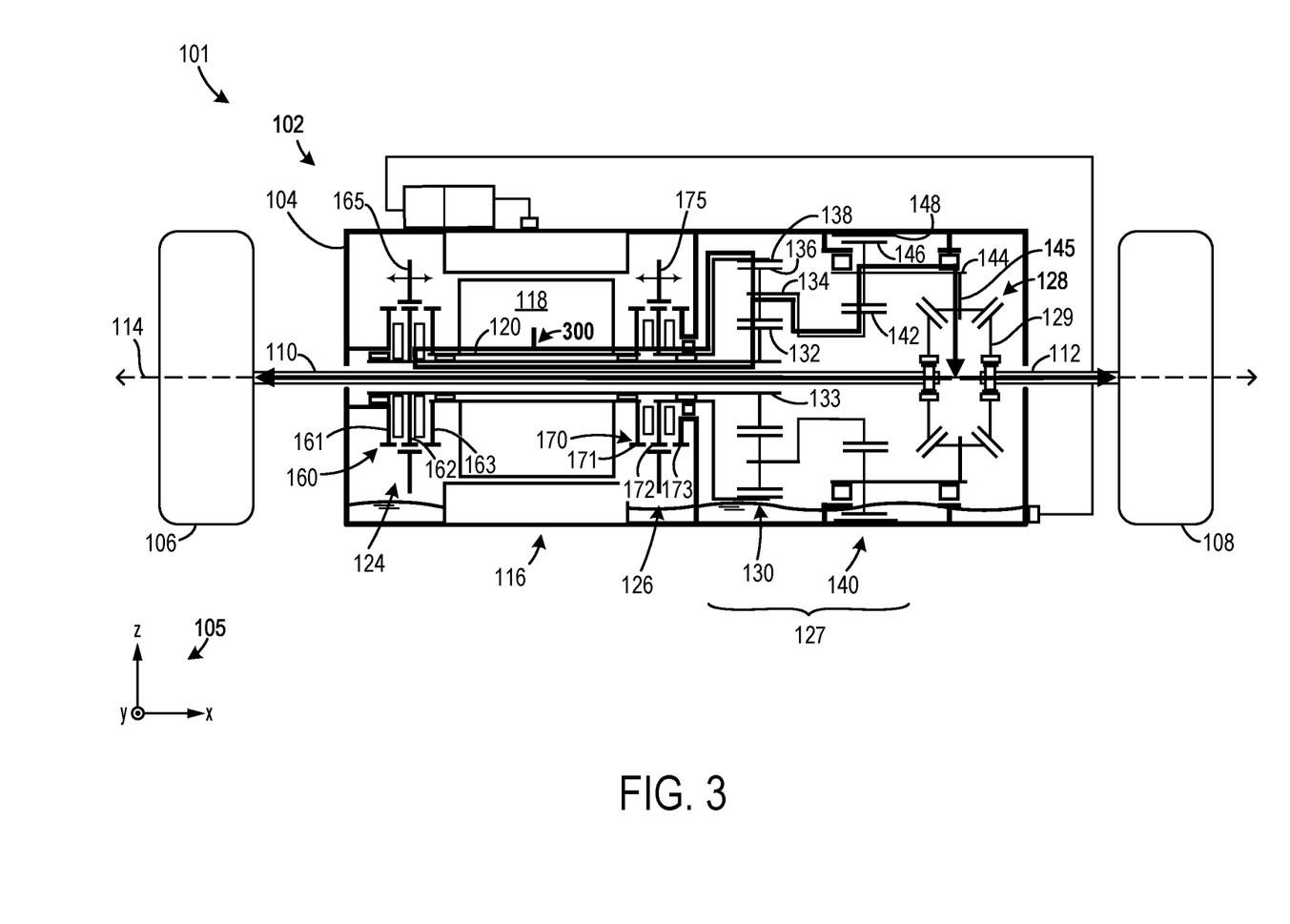
FIG. 3 shows the multi-speed transmission of FIG. 1 operating in a first gear ratio.

In order to shift into the first gear ratio, as illustrated in FIG. 3, the shift sleeve 165 of the first clutch unit 124 is moved to a position to engage clutch interfaces 162 and 163. Additionally, to transition into the first gear ratio, the shift sleeve 175 of the second clutch unit 126 is moved to engage the clutch interfaces 171 and 172, such that both the first sun gear 132 and the first ring gear 138 are rotatably coupled to the rotor shaft 120. However, different shifting strategies may be used when the planetary assembly and clutches have alternate configurations.

In some examples, the third gear ratio may be greater than the second gear ratio, which may be greater than the first gear ratio. For instance, the first, second, and third gear ratios may be, in one use-case example, 4.00:1, 5.42:1 and 15.29:1, respectively. In another use-case example, the first, second, and third gear ratio may be 4.00:1, 6.00:1, and 12.00:1, respectively. It will be understood that other suitable gear ratios may be attained by, for instance, altering the number of teeth of each gear in the first and second planetary stages or otherwise modifying the planetary assembly. A higher gear ratio may be desired upon vehicle launch, such that the second or third gear ratios may be utilized to provide greater torque at the wheels. Conversely, at higher vehicle speeds, a lower gear ratio such as the first gear ratio selection may be wanted.

For each of the selectable gear ratios, the second carrier 144 of the second planetary stage 140 may serve as an output of the planetary assembly 127. The planetary output provides rotational power to the shaft 145 (or shaft and gear combination) that is integral to the case 129 of the differential 128. From the differential power is transferred to the left and right axle shafts 110, 112 to provide rotation to the drive wheels 106, 108, respectively.

Further, due to the grounding of the second ring gear 148 of the second stage 140 to the housing 104, in conjunction with the clutch units 124, 126 being configured to interact with the first planetary stage 130, it will be understood that a constant gear reduction may be provided through the second planetary stage 140 of the planetary assembly 127, such that shifting between gear ratios is reliant on the power input provided to the gears of the first planetary stage 130 via the positional configuration of the first and second clutch units described herein, and adjusting the overall gear reduction achieved through the planetary assembly 127 may be dependent upon the gear reduction of the first planetary stage.

FIGS. 3-5 illustrate the electric drive system 101 with the transmission 102 operating in the aforementioned gear ratio selections. As such, the components of the transmission 102 in FIGS. 3-5 may share common numbering with the transmission of FIG. 1, and repeated detailed description of these components may be omitted for brevity. Further, the clutch configurations corresponding to the first, second, and third gear ratios described with reference to FIG. 2 are depicted in FIGS. 3-5, respectively, as well as the resulting power paths through the electric drive system 101 to the drive wheels 106, 108. The power paths illustrated herein are drive mode (e.g., forward or reverse drive mode) power paths where power flows from the motor to the drive wheels. However, it will be appreciated that in a regenerative mode the power paths may be reversed and flow from the drive wheels to the motor.

Turning to FIG. 3, the transmission 102 is illustrated operating in the first gear ratio, also referred to as a first gear mode, with a first gear power path 300. Specifically, in the first gear mode, the shift sleeve 165 of the first clutch unit 124 locks the sun gear 132 of the first planetary stage 130 for rotation with the rotor shaft 120 by engaging clutch interfaces 162 and 163. Additionally, in the first gear mode, the shift sleeve 175 of the second clutch unit 126 locks the first ring gear 138 for rotation with rotor shaft 120 by engaging clutch interfaces 171 and 172. Therefore, in the first gear mode, the first sun gear 132 and the first ring gear 138 are both rotationally coupled to the rotor shaft 120.

The first gear power path 300 unfolds as follows: power is transferred from the electric motor 116 through the rotor shaft 120 to the ring gear 138 and the sun gear 132 in the first planetary stage 130. Next, power flows through the first carrier 134 to the second sun gear 142 of the second planetary stage 140. Next, the power path moves through the planet gears 146 to the second carrier 144, and from the second carrier to the shaft 145. From the shaft 145, power is transferred to the differential 128 and then to the drive wheels 106, 108 via the axle shafts 110, 112, respectively.

FIG. 4 depicts the electric drive system 101 operating in the second gear ratio, also referred to as a second gear mode, that has a second gear power path 400. In the second gear mode, the shift sleeve 165 of the first clutch unit 124 grounds the first sun gear 132 in the first planetary stage 130 to the housing 104 by engaging clutch interfaces 161 and 162. Further, in the second gear mode, the shift sleeve 175 of the second clutch unit 126 locks the first ring gear 138 for rotation with the rotor shaft 120 by engaging the clutch interfaces 171 and 172. As such, in the second gear mode, with the first ring gear 138 rotationally coupled to the rotor shaft 120 and the first sun gear 132 is grounded by the housing 104.

The second gear power path 400 unfolds as follows: power is transferred from the electric motor 116 through the rotor shaft 120 to the first ring gear 138 of the first planetary stage 130. Next power flows through the planet gears 136 to the first carrier 134. Next the power path travels from the carrier 134 to the second sun gear 142 of the second planetary stage 140. From the second sun gear 142, the power path moves through the planet gears 146 and to the second carrier 144. Next, the power path travels through the shaft 145, and the differential 128, as described above, such that power is transferred to the drive wheels 106, 108 via the axle shafts 110, 112, respectively.

FIG. 5 depicts the electric drive system 101 operating in the third gear ratio, also referred to as a third gear mode, that has a third gear power path 500. In the third gear mode, the shift sleeve 165 of the first clutch unit 124 locks the first sun gear 132 of the first planetary stage 130 for rotation with the rotor shaft 120 by engaging clutch interfaces 162 and 163. Further, in the third gear mode, the shift sleeve 175 of the second clutch unit 126 grounds the first ring gear 138 of the first planetary stage to the housing 104 by engaging clutch interfaces 172 and 173. As such, in the third gear mode, the first sun gear 132 is rotationally coupled to the rotor shaft 120 and the first ring gear 138 is grounded by the housing 104.

The third gear power path 500 unfolds as follows: power is transferred from the electric motor 116 through the rotor shaft 120 to the first sun gear 132 of the first planetary stage 130. The power path then moves through the planet gears. Power is then transferred to the second sun gear 142 of the second planetary stage 140 via rotation of the first carrier 134 of the first planetary stage, and then moves through the second planetary stage 140, the shaft 145, and the differential 128, as described above with respect to power paths 300 and/or 400, such that power is transferred to the drive wheels 106, 108 via the axle shafts 110, 112, respectively.

In addition to the aforementioned operating modes, the electric drive system 101 may include a reverse mode with the electric motor 116 operating in an opposite direction compared to the direction of rotation in a forward driving mode. To elaborate, in the reverse mode, the motor 116 may be rotated in the opposite direction while the transmission is in the first, second, and/or third gears.

Figure 6:
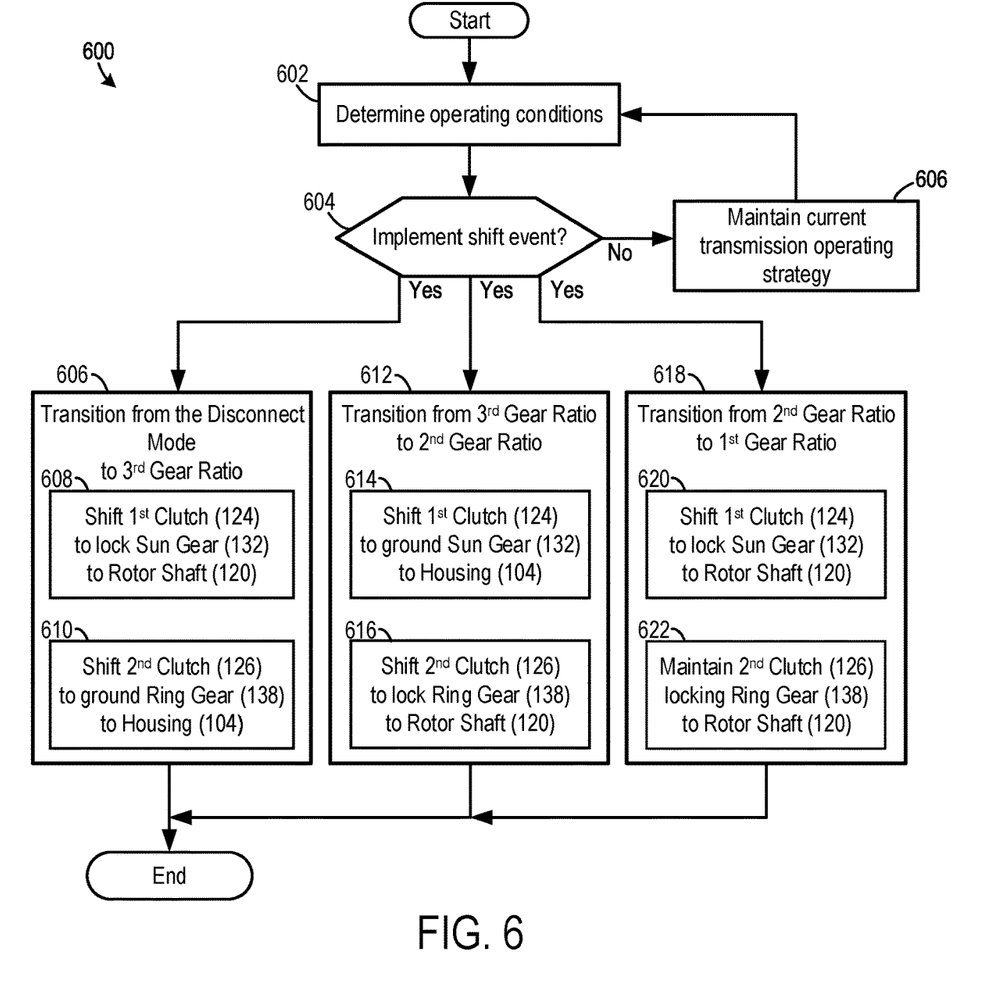
FIG. 6 shows a method for shifting between gear ratios in a multi-speed transmission.

FIG. 6 illustrates a method 600 for operation of a transmission system in a vehicle. The method 600 may be executed by the control system 180 and electric drive system 101 of the vehicle 100, shown in FIG. 1. Alternatively, the method 600 may be implemented by other suitable control and electric drive systems. Further, the instructions for carrying out the method 600 may be executed by one or more controllers based on instructions stored in memory and in conjunction with signals received from the vehicle system. The controller(s) may employ actuators of the electric drive system to adjust vehicle operation, according to the method.

At 602, the method includes determining operating conditions. The operating conditions may include an input device state, clutch configuration, vehicle speed, vehicle load, etc. The operating conditions may be ascertained via sensor inputs, modeling, look-up tables, and/or other suitable techniques. In one example, a drive device (e.g., accelerator pedal) request from a vehicle operator may be determined via an accelerator pedal sensor. In another example, a vehicle speed may be determined by speed sensors coupled to the drive wheels. In some cases, a gear selector position may be determined. The gear selector may be associated with a drive mode, in an automatic shifting scenario, or may be associated with a discrete gear ratio in a manual shifting scenario.

Next, at 604, the method determines whether or not to implement a shift event. For instance, when automatic shifting strategies are implemented, a shift event may be triggered based on vehicle speed, vehicle load, and/or a power request. In one example, the method may automatically generate a shift requests that trigger a shift event when vehicle speed surpasses a threshold value. The speed threshold may be a fixed or dynamic value, in different examples. The dynamic value may be adjusted depending on the application and/or vehicle operating environment. However, numerous suitable techniques for triggering a shift event has been contemplated. For instance, an operator may interact with an input device, such as a gear selector, which generates a shift request that triggers a gear shift.

If it is determined that a shift event should not be implemented (NO at 604), the method moves to 606 where the method includes maintaining the current transmission operating strategy. For instance, the controller may maintain the first clutch unit and/the second clutch unit in their current position to keep the transmission in its current gear ratio. It may be determined that a shift event should not be implemented when, for example, the vehicle speed and/or a power request is/are below threshold value(s).

Conversely, if a shift event is slated for implementation (YES at 604), the method moves to steps 606, 612, or 618. The exact shift event that is selected may be based on the current operating gear, the vehicle speed, the vehicle load, and/or the operator power request. For instance, if the vehicle is at or near zero speed, the transmission is in the disconnect mode, and a power request surpasses a threshold value, step 606 may be triggered. On the other hand, if the transmission is in the third gear and the vehicle speed exceeds a threshold value, step 612 may be implemented. Conversely, if the vehicle is in the second gear and the vehicle speed exceeds a threshold value, step 618 may be implemented.

At 606, the method includes transitioning the transmission from the disconnect mode (e.g., neutral) to the third gear ratio. Transitioning the transmission from the disconnect mode to the third gear ratio may include steps 608-610. At 608, the first clutch unit 124 is adjusted to lock the sun gear 132 of the first stage 130 of the planetary assembly 127 for rotation with the rotor 118. At 610, the second clutch unit 126 is adjusted to ground the ring gear 138 of the first stage of the planetary assembly to the housing 104. It will be appreciated that steps 608 and 610 may be implemented at overlapping time intervals.

At 612, the method includes transitioning the transmission from the third gear ratio to the second gear ratio which may include steps 614-616. At 614, the first clutch unit 124 is adjusted to ground the sun gear 132 to the housing 104. At 616, the second clutch unit 126 is adjusted to lock the ring gear 138 for rotation with the rotor 118. Again, steps 614 and 616 may be implemented at overlapping time intervals At 618, the method includes transitioning the transmission from the second gear ratio to the first gear ratio which may include steps 620-622. At 620, the first clutch unit 124 is adjusted to lock the sun gear 132 for rotation with the rotor 118. At 622, however, the configuration of second clutch unit 126 is maintained. In other words, the second clutch unit 126 may have the same configuration in the first gear ratio as in the second gear ratio, where the ring gear 138 is locked for rotation with the rotor 118. Method 600 allows the first and second clutch units to transition between different gear ratios, whereby vehicle performance and engine efficiency may be increased due to the available gear ratios and the shift control strategies implemented.

The technical effect of the transmission system operating methods described herein is to provide a compact electric drive architecture for shifting between selectable gear ratios to increase motor efficiency and vehicle performance.

FIGS. 1, 3-5, and 7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a multi-speed transmission system for a vehicle is provided that comprises a housing, an electric motor comprising a stator and a rotor positioned within the housing, a planetary assembly positioned on a first axial side of the electric motor, and a first and second clutch unit spaced away from one another, each including a synchronizer, and designed to selectively rotationally couple the rotor to or ground a plurality of gears in the planetary assembly, wherein the electric motor and planetary assembly are coaxially arranged.

In another aspect, a method is provided for operating an electric drive system. The method comprises transitioning between two of a plurality of gear ratios in a planetary assembly through operation of first and second clutch units that each include a synchronizer and are positioned on opposing axial sides of an electric motor and coupled to the planetary assembly and/or a rotor shaft of the electric motor in different positions, wherein the first and second clutch units, the electric motor, the planetary assembly, and a differential are coaxially arranged.

In yet another aspect, an electric transaxle is provided that comprises a first dog clutch with a synchronizer device positioned on a first axial side of an electric motor spaced away from a multi-stage planetary gearset, a second dog clutch with a synchronizer device positioned on a second axial side of the electric motor adjacent to the multi-stage planetary gearset, a differential rotationally coupled to the multi-stage planetary gearset, and a controller including instructions that when executed, in response to receiving or generating a shift request, cause the controller to operate the first and second dog clutches and synchronizers to shift between two of three gear ratios of the multi-stage planetary gearset.

In any of the aspects or combinations of the aspects, the planetary assembly may be a two-stage planetary gearset comprising a first stage with a carrier coupled to a sun gear of a second stage.

In any of the aspects or combinations of the aspects, the first and second clutch units may each include a dog clutch designed to shift between a plurality of gear ratios.

In any of the aspects or combinations of the aspects, a controller may be provided including instructions that when executed, in response to receiving or generating a shift request, cause the controller to: transition between two of the plurality of gear ratios through operation of the first and second clutch units to ground a first gear of the planetary assembly while grounding or rotationally coupling a second gear of the planetary assembly to the rotor.

In any of the aspects or combinations of the aspects, the first clutch unit may ground the sun gear in the first stage of the planetary assembly, in a first position, and rotationally couple the rotor to the sun gear, in a second position; and the second clutch unit may ground a ring gear in the first stage of the planetary assembly, in a first position, and rotationally couple the rotor to the ring gear, in a second position.

In any of the aspects or combinations of the aspects, the plurality of gear ratios may include first, second, and third gear ratios, wherein: in a first gear ratio, a sun gear and a ring gear of the first stage may be rotationally coupled to the rotor via the first and second clutch units, respectively; in a second gear ratio, the sun gear of the first stage may be grounded by the housing via the first clutch unit and the ring gear of the first stage may be rotationally coupled to the rotor via the second clutch unit; and in a third gear ratio, the sun gear of the first stage may be rotationally coupled to the rotor via the first clutch unit and the ring gear of the first stage may be grounded by the housing via the second clutch unit.

In any of the aspects or combinations of the aspects, a ring gear of the second stage may be grounded by the housing.

In any of the aspects or combinations of the aspects, a carrier of the second stage may made be integrally formed with a case of a differential.

In any of the aspects or combinations of the aspects, the differential may be coaxially positioned outboard from the planetary assembly, and an axle shaft may extend through the electric motor, the planetary assembly, the first and second clutch units, and the differential.

In any of the aspects or combinations of the aspects, the transmission system may further include a set of deep-groove spherical ball bearings coupled to a case of the differential.

In any of the aspects or combinations of the aspects, the housing may enclose the electric motor, the planetary assembly, the first and second clutch units, and the differential.

In any of the aspects or combinations of the aspects, the transmission system may include a lubricant conduit that routes a lubricant from the electric motor to the planetary assembly.

In any of the aspects or combinations of the aspects, transitioning between two of the plurality of gear ratios may include: grounding a sun gear of the planetary assembly to a housing of the electric drive system or rotationally coupling the sun gear to the rotor shaft of the electric motor; and grounding a ring gear of the planetary assembly to the housing or rotationally coupling the ring gear to the rotor shaft.

In any of the aspects or combinations of the aspects, the first and second clutch units may be shifted to operate the electric drive system in a disconnect mode wherein the planetary assembly is disconnected from the electric motor.

In any of the aspects or combinations of the aspects, operating the first and second dog clutches to shift between two of the three gear ratios of the multi-stage planetary gearset may include: rotationally coupling at least one of a sun gear and a ring gear in a first stage of the multi-stage planetary gearset to a rotor shaft.

In any of the aspects or combinations of the aspects, operating the first and second dog clutches to shift between two of the three gear ratios of the multi-stage planetary gearset may include: grounding at least one of a sun gear and a ring gear in a first stage of the multi-stage planetary gearset to a housing.

In any of the aspects or combinations of the aspects, the transmission system may include a housing that encloses the electric motor, the first and second dog clutches, and the differential, wherein a stator in the electric motor is fixedly coupled to the housing and a ring gear in a second stage of the multi-stage planetary gearset is grounded by the housing.

In any of the aspects or combinations of the aspects, the transmission may include an axle shaft rotationally coupled to a side gear of the differential is positioned in a central opening that extends through the multi-stage planetary gearset, the first and second dog clutches, and the electric motor.

In another representation, an electric drive axle is provided that includes an electric machine with two synchronizers that are coupled to a rotor shaft of the electric machine on opposing lateral sides, wherein the synchronizers are configured to selectively rotationally coupled to different input gears in a first stage of a two-stage planetary gearset and wherein the second stage has a fixed gear ratio.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the powertrain control system, where the described actions are carried out by executing the instructions in a system including the various powertrain hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed transmission system for a vehicle, comprising:
a housing;
an electric motor comprising a stator and a rotor positioned within the housing;
a planetary assembly positioned on a first axial side of the electric motor; and
a first clutch unit and a second clutch unit spaced away from one another, each including a synchronizer device, and designed to selectively rotationally couple the rotor to or ground a plurality of gears in the planetary assembly;
wherein the electric motor and planetary assembly are coaxially arranged.

2. The multi-speed transmission system of claim 1, wherein the planetary assembly is a two-stage planetary gearset comprising a first stage with a carrier coupled to a sun gear of a second stage.

3. The multi-speed transmission system of claim 2, wherein:
the first and second clutch units each include a dog clutch designed to shift between a plurality of gear ratios.

4. The multi-speed transmission system of claim 3, further comprising:
a controller including instructions that when executed, in response to receiving or generating a shift request, cause the controller to:
transition between two of the plurality of gear ratios through operation of the first and second clutch units to ground a first gear of the planetary assembly while grounding or rotationally coupling a second gear of the planetary assembly to the rotor.

5. The multi-speed transmission system of claim 3, wherein:
the first clutch unit grounds the sun gear in the first stage of the planetary assembly, in a first position, and rotationally couples the rotor to the sun gear, in a second position; and
the second clutch unit grounds a ring gear in the first stage of the planetary assembly, in a first position, and rotationally couples the rotor to the ring gear, in a second position.

6. The multi-speed transmission system of claim 5, wherein:
the plurality of gear ratios includes a first, second, and third gear ratio;
in the first gear ratio, a sun gear and a ring gear of the first stage rotationally coupled to the rotor via the first and second clutch units, respectively;
in the second gear ratio, the sun gear of the first stage is grounded by the housing via the first clutch unit and the ring gear of the first stage is rotationally coupled to the rotor via the second clutch unit; and
in the third gear ratio, the sun gear of the first stage is rotationally coupled to the rotor via the first clutch unit and the ring gear of the first stage is grounded by the housing via the second clutch unit.

7. The multi-speed transmission system of claim 2, wherein a ring gear of the second stage is grounded by the housing.

8. The multi-speed transmission system of claim 2, wherein a carrier of the second stage is rotationally coupled to a case of a differential.

9. The multi-speed transmission system of claim 8, wherein the differential is coaxially positioned outboard from the planetary assembly, and an axle shaft extends through the electric motor, the planetary assembly, the first and second clutch units, and the differential.

10. The multi-speed transmission system of claim 8, further comprising a set of deep-groove spherical ball bearings coupled to a case of the differential.

11. The multi-speed transmission system of claim 8, wherein the housing encloses the electric motor, the planetary assembly, the first and second clutch units, and the differential.

12. The multi-speed transmission system of claim 1, further comprising a lubricant conduit routing a lubricant from the electric motor to the planetary assembly.

13. An electric transaxle, comprising:
a first dog clutch with a first synchronizer device positioned on a first axial side of an electric motor spaced away from a multi-stage planetary gearset;
a second dog clutch with a first synchronizer device positioned on a second axial side of the electric motor adjacent to the multi-stage planetary gearset;
a differential rotationally coupled to the multi-stage planetary gearset; and
a controller including instructions that when executed, in response to receiving or generating a shift request, cause the controller to:
operate the first and second dog clutches and synchronizer devices to shift between two of three gear ratios of the multi-stage planetary gearset.

14. The electric transaxle of claim 13, wherein operating the first and second dog clutches to shift between two of the three gear ratios of the multi-stage planetary gearset includes:
rotationally coupling at least one of a sun gear and a ring gear in a first stage of the multi-stage planetary gearset to a rotor shaft.

15. The electric transaxle of claim 13, wherein operating the first and second dog clutches to shift between two of the three gear ratios of the multi-stage planetary gearset includes:
grounding at least one of a sun gear and a ring gear in a first stage of the multi-stage planetary gearset to a housing.

16. The electric transaxle of claim 13, further comprising a housing enclosing the electric motor, the first and second dog clutches, and the differential, and wherein a stator in the electric motor is fixedly coupled to the housing and a ring gear in a second stage of the multi-stage planetary gearset is grounded by the housing.

17. The electric transaxle of claim 13, wherein an axle shaft rotationally coupled to a side gear in the differential is positioned in a central opening that extends through the multi-stage planetary gearset, the first and second dog clutches, and the electric motor.

\* \* \* \* \*

UNITED STATES PATENT AND TRADEMARK OFFICE
CERTIFICATE OF CORRECTION

| | | |
|---|---|---|
| PATENT NO. | : 11,707,981 B2 | Page 1 of 1 |
| APPLICATION NO. | : 17/337324 | |
| DATED | : July 25, 2023 | |
| INVENTOR(S) | : Gowrisankar Devaraj | |

It is certified that error appears in the above-identified patent and that said Letters Patent is hereby corrected as shown below:

On the Title Page

Item (12) Should read DEVARAJ

Item (72) Should read Gowrisankar DEVARAJ, Leamington Spa (UK);

Signed and Sealed this
Fifteenth Day of April, 2025

Coke Morgan Stewart
*Acting Director of the United States Patent and Trademark Office*